3,528,958
MODIFIED OLEFIN POLYMERS OF
IMPROVED PROPERTIES
George S. Achorn, Pittsburgh, Pa., assignor to Sinclair-
Koppers Company, a partnership of Delaware
No Drawing. Filed Mar. 16, 1967, Ser. No. 623,547
Int. Cl. C08f 27/08
U.S. Cl. 260—94.9                    4 Claims

ABSTRACT OF THE DISCLOSURE

The stiffness and color of alpha-olefin polymers prepared using a Ziegler-type coordination catalyst system are improved by incorporating urea and thiourea at the terminal ends of the polymer chains at the conclusion of polymerization.

BACKGROUND OF THE INVENTION

The polymerization of ethylene and other alpha-olefins using Ziegler-type coordination catalyst systems under relatively mild conditions of temperature and pressure to produce high polymers is a well-known process. The catalyst systems are mixtures of (1) organo metallic compounds wherein the metal is selected from Groups I–A, II–A or III–A of the Periodic Table and (2) halides, alkoxides or alkoxy halides of the transition metal selected from groups IV–B, V–B, VI–B or VII–B of the Periodic Table. Typical examples of the systems are triethyl aluminum combined with titanium tetrabromide, diisobutyl aluminum chloride combined with titantium tetrachloride, and diisobutyl aluminum hydride and titanium tetrachloride combined with tetrabutyl titanate.

The mechanism of the polymerization is generally believed to involve the conversion of the monomer to a highly active specie having at least one carbon to metal bond. The polymerization is believed to proceed by incorporating additional monomer molecules between the carbon and metal atoms so that chain propagation occurs outward from the metal atoms of the catalyst. It has been found that when all of the monomer has been consumed without being replenished, the growth of the polymer chain will cease but polymerization will not necessarily be terminated. As long as active catalyst remains, either in the form of original components or some useful products they might generate, initiation of new chains and growth in older ones will occur on supplying additional monomer without adding catalyst under the original conditions of polymerization.

Termination of polymerization occurs by the breaking away of the chains from the metal as terminal olefins of high or moderate molecular weight. While this occurs to some extent, a large number of chains, depending upon the type of monomer and the conditions of the polymerization, remain associated with the metal atoms until polymerization is intentionally terminated by reacting the polymerization mixture with, for example, and excess of alcohol such as methanol. This is done in conventional purification procedures and the reaction may be set forth in the equation:

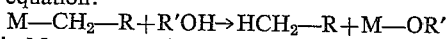

wherein M represents the metal, R is the growing polymer chain and R′ is a lower alkyl radical. This procedure is not without its problems as the termination reaction is slow, due to the insolubility of the polymer in the alcohol, as well as being incomplete since mixing the polymerization mixture with an excess of alcohol results in precipitation of the polymer as agglomerates wherein the carbon to metal bonds are inaccessible for reaction with the methanol. This purification procedure results in a polymer containing residual catalyst which adversely affects the physical properties of the polymer including its strength and color, both of which are highly important in the end uses to which the polymer is put in various industrial and commercial uses.

SUMMARY OF THE INVENTION

It has now been found that α-olefin polymers having improved physical properties are provided by reacting the polymer slurry with certain nitrogen containing compounds, namely, urea and thiourea so as to incorporate chemically combined nitrogen into the polymer chains.

In accordance with this invention, there is provided a process for making polymers having improved properties comprising reacting the carbon to metal bonds on the terminal ends of living polymers, prepared from α-olefin monomers containing from 2 to 9 carbon atoms polymerized by coordination metal catalyst system, with an organic nitrogen compound selected from the group consisting of urea and thiourea wherein the amount of organic nitrogen compound is at least one equivalent for each equivalent of catalyst.

Improved α-olefin polymers are also provided wherein the polymer contains from .025 to .20 nitrogens per molecule of chemically combined nitrogen and has a modulus of at least 165 p.s.i.×10⁻³ at a Melt Index of 0.5 g./10 min.

DETAILED DESCRIPTION

The invention is applicable to the polymerization of single or mixtures of α-olefins containing from 2 to 9 carbon atoms. These monomers include but are not limited to ethylene, propylene, butadiene, isoprene, cyclopentadiene, hexatriene, etc. and mixtures thereof.

The nitrogen containing compounds found effective in producing the improved modified polymers of the invention are urea and thiourea. These compounds readily react with the carbon to metal bonds on the terminal ends of the polymer which aids in removal of the catalyst. In addition, the physical properties of the polymer are improved it is believed because of a degree of nylon-like hydrogen bonding which occurs due to the presence of the amine groups at the end of the polymer chains. The improvement occurs in the flexural properties of the polymer in that the polymer has increased stiffness. This property is particularly important where the polymers such as polyethylene are used in making blow molded bleach and detergent bottles which must have relatively thin walls.

The termination reaction is preferably carried out by adding, after a predetermined duration of polymerization, the urea or thiourea as a terminator to the active polymerization with vigorous agitation. It has been found necessary to use at least one equivalent of terminator for each equivalent of catalyst. Using more than one hundred equivalents of terminator is wasteful and the preferred range is from about 10–20 equivalents of terminator per equivalent of catalyst.

The temperature at which the terminator is added is not critical and can be the temperature of polymerization.

Preferably the reactions are carried out at or above room temperature within the range of 20° C.–150° C. The termination reaction is preferably carried out at pressures within the range of about 1–10 atmospheres. When the termination reaction has been completed the reaction mass is mixed with approximately an equal volume of a hydroxylic solvent such as methanol or a combination of hydroxylic solvents. Optionally, a small amount of pentanedione can be added to the polymer slurry prior to the methanol wash to aid in the removal of the catalyst residue.

The invention is further illustrated but is not intended to be limited to the following examples wherein parts are parts by weight unless otherwise indicated.

Example I

A series of polymerizations were carried out using the following procedure.

A two-liter vessel equipped with a turbine type agitator and an internal heating and cooling coil was purged with nitrogen and charged with 1350 ml. of dry, deaerated hexane. A 300 ml. magnetically stirred flask was purged with nitrogen and then charged successively with 150 ml. of dry deaerated hexane at 45° C., a solution of 0.9 millimole of $TiCl_4$ in 18 ml. of hexane and a solution of 0.72 millimole of diisobutyl aluminum hydride in 14.4 ml. of hexane. The resulting catalyst slurry was aged for 15 minutes at 45° C. and then transferred to the two-liter vessel through a polyethylene tube using nitrogen pressure. There was then added to the slurry by hypodermic syringe 0.225 millimole of tetrabutyl titanate in 1.0 ml. of hexane. Stirring was commenced and the vessel was sealed. A mixture of ethylene containing the mole percent hydrogen listed in Table I below was rapidly introduced into the vessel until the pressure reached 50 p.s.i.g. and thereafter at a rate to hold this pressure. The vessel temperature was adjusted to 80° C. as quickly as possible by passing hot water through the coil and the vessel was maintained at this temperature during the polymerization time listed in Table I below. The polymerization was stopped when the polymer slurry became thick enough to be difficultly stirrable by stopping the monomer flow to the vessel. The vessel was then cooled to 45° C., the pressure vented and with nitrogen flowing through the vessel the amount (in millimoles) of additive listed in Table I below was introduced into the polymerization slurry. The vessel was resealed and the slurry heated to 80° C. and held at that temperature for the time indicated in Table I below. The reaction slurry was again cooled to 45° C. and 0.5 ml. of pentanedione were added and the reaction slurry was stirred for 5 minutes at 45° C. after which 150 ml. of methanol were added. The contents of the flask was filtered to recover the polymer and the filter cake was washed with 1000 ml. of methanol and air dried. The Melt Index of the product polymer was determined by ASTM D1238–65T. The flexural strength of the polymer by ASTM D790–66 and the color, including both brightness and yellowness by ASTM D1925–63T. The nitrogen content of the polymer in parts per million was determined by modified Kjedahl method. The number average molecular weight, $M_n$, was determined by vapor phase osmometry and the number of nitrogen atoms per molecule was then calculated. The results of the tests are reported in Table I below.

It can be seen from the physical properties of the polymers reported in Table I above that the polymers terminated by thiourea and urea had distinctly improved flectural properties particularly with respect to modulus, which is a measure of stiffness, and distinctly improved color with respect to yellowness while maintaining the brightness.

Example II

A polymerization was carried out in which an alternate purification procedure was employed after the termination of the polymerization.

A two-liter vessel which was equipped with a turbine-type agitator and an internal heating and cooling coil was purged with nitrogen and charged with 1350 ml. of dry deaerated hexane. A 300 ml. magnetically stirred flask was purged with nitrogen and then charged successively with 150 ml. of dry deaerated hexane at 45° C., a solution of 0.9 millimole of $TiCl_4$ in 18 ml. of hexane and a solution of 0.72 millimole of diisobutyl aluminum hydride in 14.4 ml. of hexane. There was then added to the slurry 0.225 millimole of tetrabutyl titanate in 1.0 ml. of hexane by hypodermic syringe. The resulting catalyst slurry was aged for 15 minutes at 45° C. and then transferred to the two-liter vessel by means of nitrogen pressure. The vessel was then sealed and the contents agitated. A mixture of hydrogen and ethylene consisting of 3.3 mole percent hydrogen was rapidly introduced into the vessel until the pressure reached 50 p.s.i.g. and then the rate was reduced to hold this pressure. The reaction temperature was adjusted to 80° C. as quickly as possible by means of water being passed through the internal coil. The temperature was maintained at 80° C. until the polymer slurry became thick enough to be difficultly stirrable at which time the polymerization was stopped by halting the flow of the ethylene-hydrogen mixture. The reactor contents were cooled at 35° C., the pressure vented and, with nitrogen flowing through the reactor, there was added to the slurry 10 millimoles of urea. The reactor was resealed and the slurry heated to 80° C. and held for 15 minutes at this temperature. The contents were again cooled, the reactor reopened and 150 ml. of methanol added. The polymer was recovered from the reaction mixture by filtration, rewashed with 1000 ml. of methanol and air dried.

Example III

The above procedure of Example II was repeated with the exception that the urea was not added to the polymerization mixture prior to termination. The polymerization was terminated by the addition of 150 ml. methanol after the flow of ethylene hydrogen mixture had been halted and the pressure in the reaction vessel had been vented upon cooling to 45° C. The polymerization slurry was divided into two aliquots. The polymer was recovered by filtration from the first aliquot. The filter cake was washed with 500 ml. of methanol and air dried. To the second aliquot there was added 5 millimoles of urea and the slurry was heated to 80° C. for 15 minutes after which the slurry was cooled to room temperature and the polymer recovered by filtration. The filter cake was washed with 500 ml. of methanol and air dried.

The Melt Index, flexural properties and color of the polymers prepared in Examples II and III were deter-

TABLE I

| Experiment No. | Hydrogen (Mole percent) | Polymerization Time (min.) | Postpolymerization Additive | | Reaction Time (min.) | Nitrogen in Product | | Molecular Weight ($M_n \times 10^{-3}$) | Melt Index, g./10min. | Flexural Strength | | Color | |
|---|---|---|---|---|---|---|---|---|---|---|---|---|---|
| | | | Additive | Amount (mmoles) | | P.p.m. | N/molecule | | | Yield | Modulus | B | Y |
| I-1 | 4.0 | 6 | Urea | 10 | 15 | 30 | 0.025 | 9.2 | .75 | 3.99 | 176.4 | 69.3 | −0.1 |
| I-2 | 3.3 | 5 | ...do... | 10 | 30 | 33 | 0.027 | 11.4 | .49 | 3.53 | 174.7 | 70.5 | 1.4 |
| I-3 | 3.3 | 5 | ...do... | 20 | 30 | 147 | 0.134 | 12.8 | .55 | 3.62 | 174.4 | 68.0 | 3.1 |
| I-4 | 3.3 | 5 | Thiourea | 15.8 | 15 | 66 | 0.054 | 13.7 | .60 | 3.60 | 173.3 | 69.4 | 4.6 |
| I-5 | 3.3 | 5 | | | | | | 10.3 | .46 | 3.54 | 153.3 | 70.0 | 4.8 | mined by the standard test methods listed in Example I with the results being reported (in Table II below) for the urea terminated polymer, the untreated polymer and the post termination urea treated polymer.

TABLE II

| Experiment No. | Hydrogen (Mole percent) | Polymerization Time (min.) | Postpolymerization Additive | | Reaction Time (min.) | Nitrogen in Product | | Molecular Weight ($M_n \times 10^{-3}$) | Melt Index, g./10min. | Flexural Strength | | Color | |
|---|---|---|---|---|---|---|---|---|---|---|---|---|---|
| | | | Additive | Amount (mmoles) | | P.p.m. | N/molecule | | | Yield | Modulus | B | Y |
| II-1 | 3.1 | 5 | Urea | 10 | 15 | 31 | 0.026 | 12.8 | .43 | 3.54 | 176.5 | 69.7 | 8.0 |
| III-1 | 3.1 | 5 | | | | | | 13.0 | .38 | 3.27 | 147.6 | 67.2 | 29.5 |
| III-2 | 3.1 | 5 | Urea | 5 | 15 | Nil | Nil | 13.0 | .38 | 3.24 | 148.4 | 66.5 | 33.2 |

From the results shown in Table II it can be seen that the flexural strength and color of the urea terminated polymer were not only superior to the control polymer but to the polymer which was treated with urea only after the polymerization had been terminated by the standard procedure of adding methanol. This shows the necessity of terminating the polymer with urea in order to obtain the improved results of the invention.

I claim:

1. Process for making polymers of improved properties comprising reacting the carbon to metal bonds on the terminal ends of living polymer prepared from α-monoolefins containing from 2–9 carbon atoms, initiated by a coordination metal catalyst system consisting essentially of organo-metallic compounds wherein the metal is selected from the Group I-A, II-A, III-A of the Periodic Table and a member selected from the group consisting of the halides, alkoxides and alkoxy halides and mixtures thereof of a transition metal selected from the Group IV-B, V-B, VI-B and VII-B of the Periodic Table, with an organic nitrogen compound selected from the group consisting of urea and thiourea wherein the amount of said compound is at least one equivalent for each equivalent of said catalyst used.

2. Process for making polymers of improved properties comprising reacting the carbon to metal bonds on the terminal ends of living polymer prepared from α-monoolefins containing from 2–9 carbon atoms, initiated by a co-ordination metal catalyst system consisting essentially of organo-metallic compounds wherein the metal is selected from the Group I-A, II-A, III-A of the Periodic Table and a member selected from the group consisting of the halides, alkoxides and alkoxy halides and mixtures thereof of a transition metal selected from the Group IV-B, V-B, VI-B and VII-B of the Periodic Table, with an organic nitrogen compound selected from the group consisting of urea and thiourea wherein the amount of said compound is at least one equivalent for each equivalent of said catalyst used and then treating the product with a methanol.

3. Polymers prepared by polymerizing α-monoolefins containing from 2–9 carbon atoms in the presence of a coordination metal catalyst system, consisting essentially of organometallic compounds wherein the metal is selected from the Group I-A, II-A, III-A of the Periodic Table and a member selected from the group consisting of the halides, alkoxides, and alkoxy halides and mixtures thereof of a transition metal selected from the Group IV-B, V-B, VI-B and VII-B of the Periodic Table, in which the terminal carbon to metal bonds on between 1 and 20 percent of the polymer chains have been reacted with an organic nitrogen compound selected from the group consisting of urea and thiourea.

4. In the process for making substantially linear α-monoolefin polymers at a temperature of from 20° C. to 150° C., and at a pressure between 1 and 10 atmospheres using a coordination metal catalyst system consisting essentially of organometallic compounds wherein the metal is selected from the Group I-A, II-A, III-A of the Periodic Table and a member selected from the group consisting of the halides, alkoxides and alkoxy halides and mixtures thereof of a transition metal selected from the Group IV-B, V-B, VI-B, and VII-B of the Periodic Table, the improvement which comprises terminating the polymerization by the addition of an organic nitrogen compound selected from the group consisting of urea and thiourea.

References Cited

UNITED STATES PATENTS 2,913,448   11/1959   Tabler _____ 260—94.9

FOREIGN PATENTS 533,362   5/1955   Belgium.

JOSEPH L. SCHOFER, Primary Examiner
RICHARD A. GAITHER, Assistant Examiner

U.S. Cl. X.R.
260—88.2, 93.1, 93.7, 94.1, 94.3